United States Patent
Swope et al.

(10) Patent No.: US 9,797,979 B2
(45) Date of Patent: Oct. 24, 2017

(54) SYSTEM FOR AND METHOD OF ESTIMATING BEARINGS OF RADIO FREQUENCY IDENTIFICATION (RFID) TAGS THAT RETURN RFID RECEIVE SIGNALS WHOSE POWER IS BELOW A PREDETERMINED THRESHOLD

(71) Applicant: SYMBOL TECHNOLOGIES, INC., Schaumburg, IL (US)

(72) Inventors: Charles B Swope, Coral Springs, FL (US); Benjamin J Bekritsky, Modiin (IL)

(73) Assignee: Symbol Technologies, LLC, Holtsville, NY (US)

( * ) Notice: Subject to any disclaimer, the term of this patent is extended or adjusted under 35 U.S.C. 154(b) by 495 days.

(21) Appl. No.: 14/509,211

(22) Filed: Oct. 8, 2014

(65) Prior Publication Data
US 2016/0103198 A1    Apr. 14, 2016

(51) Int. Cl.
| | |
|---|---|
| H01Q 3/00 | (2006.01) |
| G01S 3/28 | (2006.01) |
| G06K 7/10 | (2006.01) |
| G01S 13/68 | (2006.01) |
| G01S 13/75 | (2006.01) |
| G01S 13/87 | (2006.01) |
| G01S 3/04 | (2006.01) |
| G01S 3/40 | (2006.01) |

(52) U.S. Cl.
CPC ............... *G01S 3/28* (2013.01); *G01S 13/68* (2013.01); *G01S 13/75* (2013.01); *G06K 7/10099* (2013.01); *G01S 3/046* (2013.01); *G01S 3/40* (2013.01); *G01S 13/878* (2013.01)

(58) Field of Classification Search
CPC ... G01S 3/28; G01S 3/046; G01S 3/16; G01S 3/26; G01S 13/68; G01S 13/75; G01S 13/4445; G01S 13/4454; G01S 13/878; G06K 7/10099; G06K 7/10128; G06K 7/10366
USPC ............ 342/372, 359, 154, 354; 340/539.11, 340/539.13
See application file for complete search history.

(56) References Cited

U.S. PATENT DOCUMENTS

| | | | |
|---|---|---|---|
| 7,403,120 B2 | 7/2008 | Duron et al. | |
| 7,496,329 B2 * | 2/2009 | Patel | ........................ G01S 5/04 340/10.52 |
| 7,646,336 B2 | 1/2010 | Tan et al. | |

(Continued)

FOREIGN PATENT DOCUMENTS

EP    2020945 B1    2/2013

OTHER PUBLICATIONS

International Search Report and Written Opinion dated Jan. 22, 2016 in counterpart PCT application PCT/US2015/051444.

*Primary Examiner* — Chuong P Nguyen

(57) ABSTRACT

An RFID tag reading system and method estimate bearings of RFID tags. When the RSSI of a primary and/or secondary RFID receive signal is below a threshold, a primary receive beam is steered in a limited scan to an array of locations distributed around the location at which the RSSI of the primary receive signal is a maximum, and the RSSI of the primary receive signal is recorded at each location. The recorded RSSIs are processed to determine an effective weighted center of distribution of the recorded RSSIs, and the bearing for the tag based on the weighted center of distribution is thus estimated.

12 Claims, 9 Drawing Sheets

|   | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | | | | | | | | | | | | | | | |
| 2 | | X | | | X | | | | X | | | | | X | |
| 3 | | | | | | | | | | | | | | | |
| 4 | | | | X | | | | X | | | | X | | | |
| 5 | | | | | | | | | | | | | | | |
| 6 | | X | | | | X | | | | X | | | | X | |
| 7 | | | | | | | | | | | | | | | |
| 8 | | | | X | | | | X | | | | X | | | |
| 9 | | | | | | | | | | | | | | | |
| 10 | | X | | | | X | | | | X | | | | X | |
| 11 | | | | | | | | | | | | | | | |
| 12 | | | | X | | | | X | | | | X | | | |
| 13 | | | | | | | | | | | | | | | |
| 14 | | X | | | X | | | | X | | | | | X | |
| 15 | | | | | | | | | | | | | | | |

COARSE SCAN

(56) References Cited

U.S. PATENT DOCUMENTS

| | | | |
|---|---|---|---|
| 8,253,570 B1 | 8/2012 | McBride | |
| 8,659,430 B2* | 2/2014 | Bloy | G01S 5/0215 |
| | | | 340/10.1 |
| 9,111,190 B2* | 8/2015 | Jacques | G01S 3/28 |
| 9,367,785 B2* | 6/2016 | Sabesan | G01S 7/42 |
| 9,477,865 B2* | 10/2016 | Koch | G06K 7/10366 |
| 2007/0141997 A1* | 6/2007 | Wulff | G06K 19/0723 |
| | | | 455/78 |
| 2008/0318683 A1 | 12/2008 | Rofougaran et al. | |
| 2009/0002165 A1* | 1/2009 | Tuttle | G01S 3/48 |
| | | | 340/572.1 |
| 2010/0039228 A1* | 2/2010 | Sadr | G01S 5/12 |
| | | | 340/10.1 |
| 2010/0225480 A1* | 9/2010 | Bloy | G01S 5/0215 |
| | | | 340/572.1 |
| 2011/0050421 A1* | 3/2011 | Duron | G01S 13/589 |
| | | | 340/572.1 |
| 2011/0169613 A1* | 7/2011 | Chen | G01S 13/4445 |
| | | | 340/10.4 |
| 2013/0021141 A1 | 1/2013 | Brommer et al. | |
| 2014/0125459 A1* | 5/2014 | Sabahialshoara | G01S 13/751 |
| | | | 340/10.1 |
| 2014/0197928 A1 | 7/2014 | Jacques et al. | |
| 2017/0109555 A1* | 4/2017 | Koch | G01S 13/751 |

* cited by examiner

|    | 1 | 2 | 3 | 4 | 5 | 6 | 7 | 8 | 9 | 10 | 11 | 12 | 13 | 14 | 15 |
|----|---|---|---|---|---|---|---|---|---|----|----|----|----|----|----|
| 1  |   |   |   |   |   |   |   |   |   |    |    |    |    |    |    |
| 2  |   | X |   |   |   | X |   |   |   | X  |    |    |    | X  |    |
| 3  |   |   |   |   |   |   |   |   |   |    |    |    |    |    |    |
| 4  |   |   |   | X |   |   |   | X |   |    |    | X  |    |    |    |
| 5  |   |   |   |   |   |   |   |   |   |    |    |    |    |    |    |
| 6  |   | X |   |   |   | X |   |   |   | X  |    |    |    | X  |    |
| 7  |   |   |   |   |   |   |   |   |   |    |    |    |    |    |    |
| 8  |   |   |   | X |   |   |   | X |   |    |    | X  |    |    |    |
| 9  |   |   |   |   |   |   |   |   |   |    |    |    |    |    |    |
| 10 |   | X |   |   |   | X |   |   |   | X  |    |    |    | X  |    |
| 11 |   |   |   |   |   |   |   |   |   |    |    |    |    |    |    |
| 12 |   |   |   | X |   |   |   | X |   |    |    | X  |    |    |    |
| 13 |   |   |   |   |   |   |   |   |   |    |    |    |    |    |    |
| 14 |   | X |   |   |   | X |   |   |   | X  |    |    |    | X  |    |
| 15 |   |   |   |   |   |   |   |   |   |    |    |    |    |    |    |

COARSE SCAN

*FIG. 9*

|   | 1 | 2 | 3 |
|---|---|---|---|
| 1 | -43 | -44 | -47 |
| 2 | -42 | -42 | -49 |
| 3 | -43 | -44 | -52 |

WEIGHTED CENTER OF DISTRIBUTION

LIMITED SCAN

*FIG. 10*

SYSTEM FOR AND METHOD OF ESTIMATING BEARINGS OF RADIO FREQUENCY IDENTIFICATION (RFID) TAGS THAT RETURN RFID RECEIVE SIGNALS WHOSE POWER IS BELOW A PREDETERMINED THRESHOLD

BACKGROUND OF THE INVENTION

The present disclosure relates generally to a system for, and a method of, estimating bearings of radio frequency (RF) identification (RFID) tags associated with items located in a controlled area, especially when the tags return RFID receive signals whose power is below a predetermined threshold due to such real-world conditions as multi-path reflections, destructive signal interference, ambient temperature variations, etc.

Radio frequency (RF) identification (RFID) technology is becoming increasingly important for logistics concerns, material handling and inventory management in retail stores, warehouses, distribution centers, buildings, and like controlled areas. An RFID system typically includes an RFID reader, also known as an RFID interrogator, and preferably a plurality of such readers distributed about the controlled area. Each RFID reader interrogates at least one RFID tag, and preferably many more RFID tags, in its coverage range. Each RFID tag is usually attached to, or associated with, an individual item, or to a package for the item, or to a pallet or container for multiple items. Each RFID tag typically includes an antenna, a power management section, a radio section, and frequently a logic section containing a control microprocessor, a memory, or both. Each RFID reader transmits an RF interrogating signal, and each RFID tag, which senses the interrogating RF signal, responds by transmitting a return RFID receive signal. The RFID tag either generates the return RFID receive signal originally, or reflects back a portion of the interrogating RF signal in a process known as backscatter. The return RFID receive signal may further encode data stored internally in the tag. The return RFID receive signal is demodulated and decoded into data by each reader, which thereby identifies, counts, or otherwise interacts with the associated item. The decoded data, also known as a payload, can denote a serial number, a price, a date, a destination, other attribute(s), or any combination of attributes, and so on.

The RFID system is often used in an inventory monitoring application. For example, in order to take inventory of RFID-tagged items in a retail store, it is known to position at least one RFID reader overhead in a controlled area, and then, to allow each reader to automatically read whatever tagged items are in the coverage range of each reader. For superior RF coverage, it is known to provide each reader with at least one overhead array of antenna elements that are arranged about a central vertical axis, also known as a plumb line, and that transmit the RF interrogating signal as a primary transmit beam that is electronically steered both in azimuth and in elevation, and that receive a return primary receive signal via a primary receive beam from the tags.

As satisfactory as such known RFID systems utilizing antenna arrays have been in monitoring inventory, they can also be used for locationing applications, i.e., for estimating and determining the bearing, i.e., the angular direction both in azimuth and elevation, of any particular tag, relative to a particular reader. However, there is a practical limit on the number of antenna elements that can be used in each array. This antenna element limit causes each primary transmit beam and each corresponding primary receive beam to have a relatively broad beam width. The primary transmit beam is typically steered until the reader reads the tag with the highest power or peak receive signal strength indicator (RSSI) of the return primary receive signal at a primary steering angle. However, estimating the bearing, i.e., the angular direction both in azimuth and elevation, of any particular tag based on the peak RSSI of the return primary receive signal is imprecise due to the aforementioned relatively broad beam width. Bearing errors on the order of 5 to 10 degrees have been reported and are not readily tolerable in locationing applications.

To improve the accuracy of estimating the location of a particular tag and obtain a true bearing, it is known to generate multiple secondary receive beams pointing in different directions, and to respectively capture return secondary receive signals. The primary and the secondary receive beams are jointly moved together, as a unit, in a search pattern or path in the controlled area. The controlled area is divided into multiple sectors or zones, in which the joint unit movement of the primary and the secondary receive beams is performed at multiple primary steering angles in each sector. The secondary receive signals are processed to generate azimuth and elevation error signals as azimuth and elevation corrections to the primary steering angle of the primary receive beam, thereby reducing the bearing error.

Yet, as advantageous as the known RFID system has been in accurately locating the true bearings of tags generally located in the controlled area, experience has shown that there are times when real-world conditions may sometimes interfere with the generation and processing of the return primary and secondary receive signals. For example, the controlled area may contain shelving, fixtures, equipment, vehicles, and the like, not to mention the floor, the ceiling and the room walls, each or all of which can reflect and scatter the primary and/or secondary receive beams incident thereon, thereby compromising the generation and processing of their corresponding receive signals such that one or more of such receive signals have no or low power, i.e., their RSSI is below a minimum acceptable threshold, due to multi-path reflections, destructive interference among signals, ambient temperature variations, etc. As a result, the known RFID system cannot always accurately estimate the true bearing of a tag for such a real-world environment.

Accordingly, there is a need to estimate the bearings of RFID tags located anywhere in a controlled area, especially in a real-world environment where such receive signals have no or low power.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 9 diagrammatically depicts a coarse scan performed by the system in accordance with the present disclosure.

FIG. 10 diagrammatically depicts a limited scan performed by the system in accordance with the present disclosure.

Figure 1:
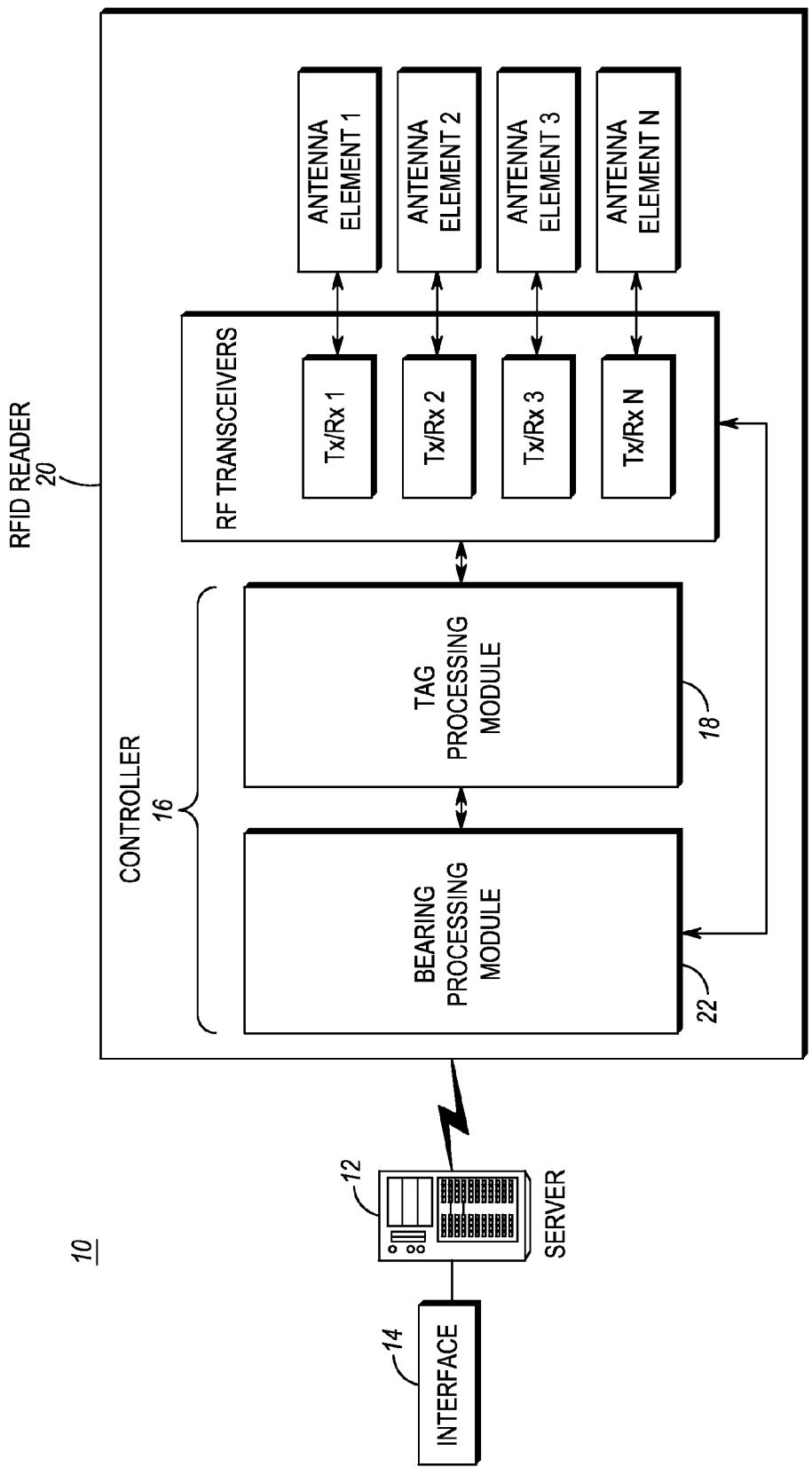
FIG. 1 is a schematic view of an exemplary radio frequency identification (RFID) tag reading system for estimating bearings of RFID tags associated with items in a controlled area in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure relates to a radio frequency (RF) identification (RFID) tag reading system for estimating bearings of RFID tags associated with items in a controlled area, of particular benefit when the RFID tags return receive signals whose power is below a predetermined threshold due to such real-world conditions as multi-path reflections, destructive signal interference, ambient temperature variations, etc. The controlled area may be a retail store, a warehouse, or any other confined or open area in which RFID-tagged items are to be monitored or located. The system includes one or more RFID readers each having a plurality of antenna elements, e.g., a beamforming array, preferably mounted overhead and arranged about a vertical axis or plumb line; a plurality of RF transceivers; and a controller or programmed microprocessor operatively connected to the transceivers, and operative for controlling the transceivers.

The controller executes a tag processing module operative for steering a primary transmit beam in the controlled area by transmitting a primary transmit signal via the antenna elements to the tag, and for steering a primary receive beam in the controlled area at a primary steering angle by receiving a primary receive signal via the antenna elements from the tag. The controller also executes a bearing processing module operative for steering a plurality of secondary receive beams in the controlled area at respective secondary steering angles that are offset from the primary steering angle by receiving a plurality of secondary receive signals via the antenna elements from the tag.

The controller steers the primary receive beam to a plurality of locations of a sector in the controlled area in a coarse scan to find the tag, and steers the secondary receive beams to the found tag. The controller compares a receive signal strength indicator (RSSI) of at least one of the secondary receive signals against a threshold, and, when the RSSI is below the threshold, determines the location at which the RSSI of the primary receive signal is a maximum, and steers the primary receive beam in a limited scan to an array of locations distributed around the location at which the RSSI is a maximum. Preferably, the array of locations is a mutually orthogonal arrangement of an odd number of rows and an odd number of columns, and the location at which the RSSI is a maximum is at a center of the array.

The controller also records the RSSI of the primary receive signal at each location of the limited scan, and processes the recorded RSSIs at each location of the limited scan to determine an effective weighted center of distribution of the recorded RSSIs. The controller estimates the bearing for the tag based on the weighted center of distribution.

A method, in accordance with another aspect of the present disclosure, of estimating a bearing of an RFID tag associated with an item in a controlled area having sectors, is performed by mounting an RFID reader having a plurality of antenna elements, and a plurality of RF transceivers, in the controlled area. The transceivers are controlled by executing a tag processing module operative for steering a primary transmit beam in the controlled area by transmitting a primary transmit signal via the antenna elements to the tag, and for steering a primary receive beam in the controlled area at a primary steering angle by receiving a primary receive signal via the antenna elements from the tag. The transceivers are further controlled by executing a bearing processing module operative for steering a plurality of secondary receive beams in the controlled area at respective secondary steering angles that are offset from the primary steering angle by receiving a plurality of secondary receive signals via the antenna elements from the tag. The primary receive beam is steered to a plurality of locations of a sector in the controlled area in a coarse scan to find the tag, and the secondary receive beams are steered to the found tag. The method is further performed by comparing a receive signal strength indicator (RSSI) of at least one of the secondary receive signals against a threshold, and, when the RSSI is below the threshold, determining the location at which the RSSI of the primary receive signal is a maximum, and then, by steering the primary receive beam in a limited scan to an array of locations distributed around the location at which the RSSI is a maximum. The method also records the RSSI of the primary receive signal at each location of the limited scan, processes the recorded RSSIs at each location of the limited scan to determine an effective weighted center of distribution of the recorded RSSIs, and estimates the bearing for the tag based on the weighted center of distribution.

Turning now to the drawings, FIG. 1 depicts a simplified radio frequency (RF) identification (RFID) tag reading system 10 for estimating bearings of RFID tags associated with items to be tracked or monitored or located. The system 10 has an RFID reader 20 connected to a server or host 12 and a user interface 14. The RFID reader 20 has an array or plurality of antenna elements 1, 2, 3 . . . , N, preferably a beamforming array, or a phased array. The RFID reader 20 also has a plurality of RF transceivers Tx/Rx 1, Tx/Rx 2, Tx/Rx 3, . . . , Tx/Rx N, one transceiver for, and connected to, each antenna element. The number N is arbitrary and depends on the particular application. By way of non-limiting example, sixteen antenna elements and sixteen transceivers, as described below in connection with FIGS. 6 and 7, may be employed. As explained below, the antenna elements work in groups, typically four at a time. Although FIG. 1 depicts one transceiver for each antenna element, this need not be the case. The number of transceivers may be different from the number of antenna elements. For example, a particular transceiver may be shared with two or more antenna elements.

A controller or programmed microprocessor 16 is operatively connected to the transceivers to control their operation in one or more scans or modes of operation, as described below. The controller 16 executes a software-based, tag processing module 18, and also executes a software-based, bearing processing module 22. The modules 18 and 22 need not be software-based, but either or both of them could be hardware-based, or could be implemented in both software and hardware. Although the bearing processing module 22 is depicted in FIG. 1 as being implemented in the RFID reader 20, it will be understood that the bearing processing module 22, either in whole or in part, can also be implemented in the server 12.

Figure 2:
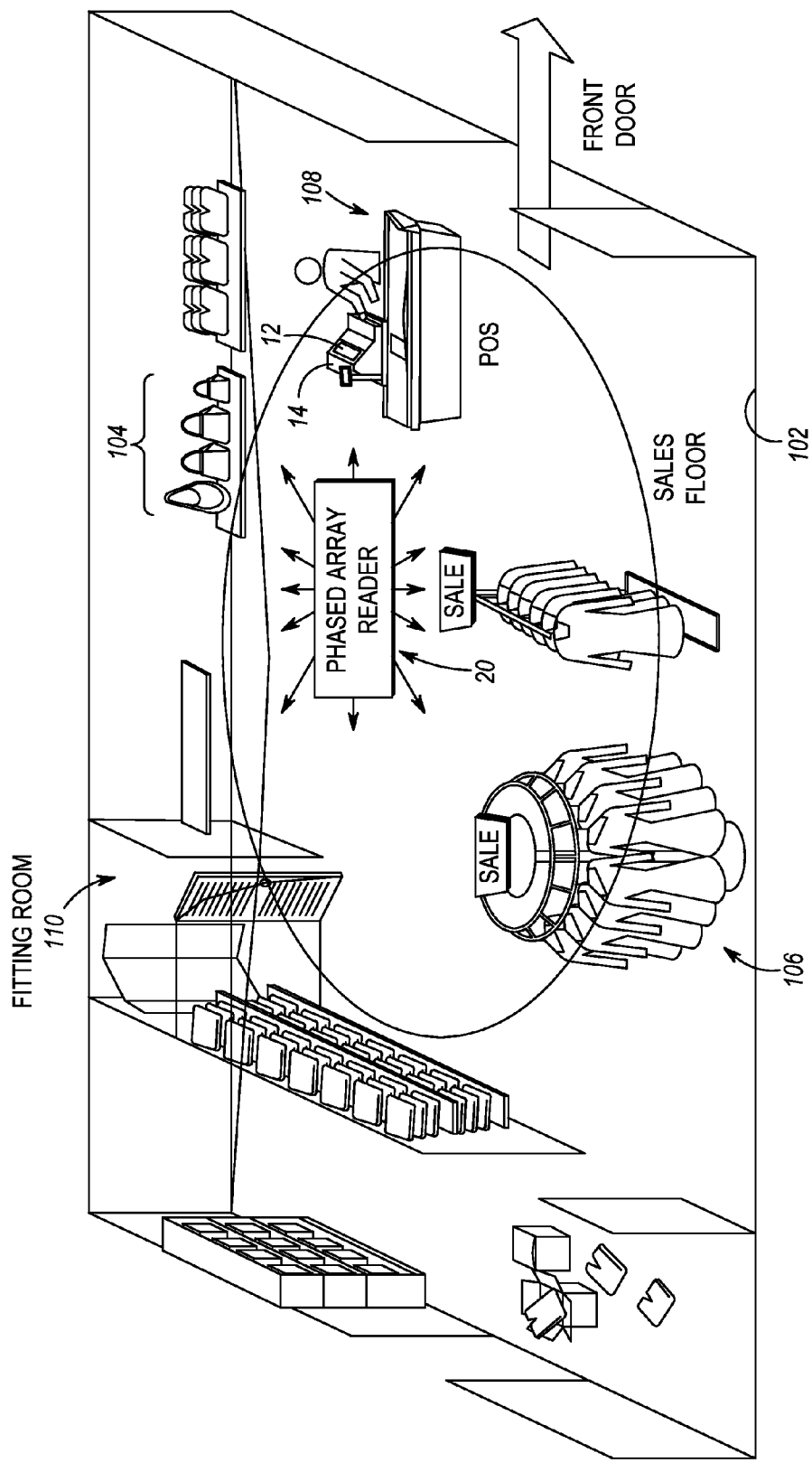
FIG. 2 is a perspective, schematic view of the system of FIG. 1 with an RFID reader and its array of antenna elements installed overhead in an exemplary controlled area, especially for locationing RFID-tagged items located underneath the overhead RFID reader and antenna array.

FIG. 2 depicts an exemplary RFID reader 20 deployed in a controlled area 102 of a retail sales floor having a point-of-sale (POS) station 108 at which the server 12 and the interface 14 may be provided, a fitting room 110, and a plurality of RFID-tagged items, e.g., clothes 106, handbags 104, etc., arranged on shelves, hangers, racks, on the floor, etc. in the controlled area 102. It will be understood that, in some applications, the server 12 is preferably located in a backroom, well away from the sales floor. Each RFID-tagged item 104, 106 is preferably associated with a passive RFID tag, e.g., not battery-operated, for cost reduction reasons, although other types of RFID tags may be employed. It will be further understood that, in some applications, for example, in a warehouse, each RFID tag is associated with a pallet or container for multiple items. To simplify the drawing, only one reader 20 has been illustrated, and the reader 20 has been illustrated as being preferably located overhead on the ceiling in the controlled area 102. It will be still further understood that more than one reader 20 could be deployed in the controlled area 102, and not necessarily deployed on the ceiling. Each reader 20 may be powered from an electrical outlet, powered over the Ethernet (POE), or can be battery powered.

The server 12 comprises one or more computers and is in wired, wireless, direct, or networked communication with the interface 14 and with the reader 20. The interface 14 provides a human/machine interface, e.g., a graphical user interface (GUI), that presents information in pictorial and/or textual form (e.g., representations of bearings of the RFID-tagged items 104, 106) to a human user, and to initiate and/or alter the execution of various processes that may be performed by the server 12 and/or by the controller 16. The server 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the server 12 may be a computer, either located at a controlled area 102 (see FIG. 2) containing the RFID-tagged items 104, 106, or remotely at some other location, or can be hosted in a cloud server. The server 12 advantageously includes a wireless RF transceiver that communicates with the reader 20. For example, Wi-Fi and Bluetooth® are open wireless standards for exchanging data between electronic devices.

Figure 3A:
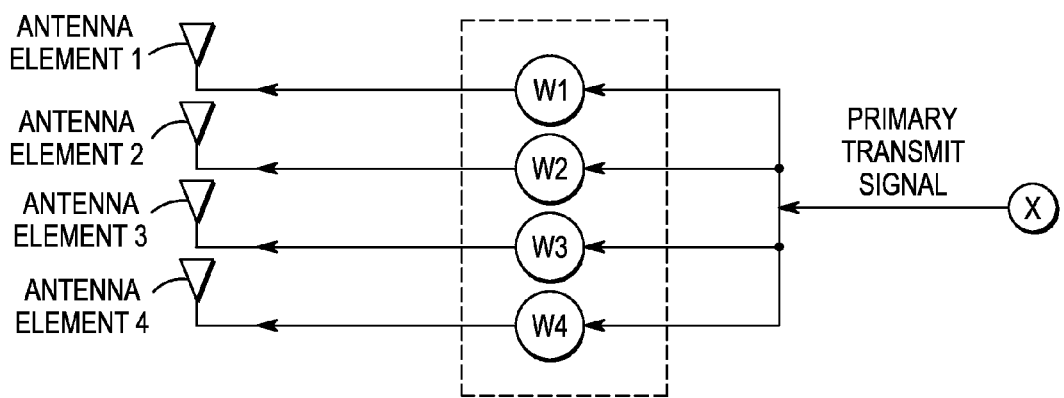
FIG. 3A is a schematic diagram depicting components of the overall system of FIG. 1 during transmission of the primary transmit beam.
Figure 3B:
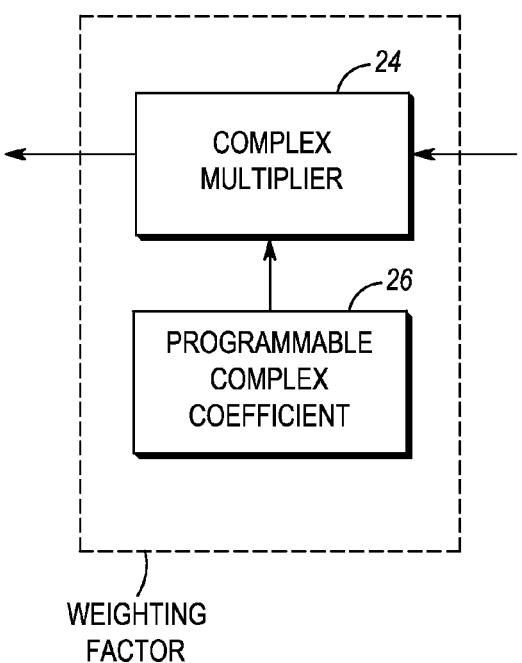
FIG. 3B is a block diagram depicting a detail of a weighting factor component for use in beam steering in the system.

The controller 16 executes the tag processing module 18 by which the transceivers are commanded to act as a primary transmit beam steering unit operative for steering a primary transmit beam over the entire controlled area 102, or over a specific sector, zone, or region of the controlled area 102, by transmitting a primary transmit signal (X) via the antenna elements to each tag. As shown in FIG. 3A, the primary transmit signal (X) is conducted along different channels (in this example, four) to a plurality of the antenna elements 1, 2, 3 and 4. Steering is accomplished by introducing a complex weighting factor W1, W2, W3 and W4 on each channel, thereby altering the respective magnitudes and phases of the signal on each channel. As shown in FIG. 3B, each weighting factor can be generated by a complex multiplier 24 and a programmable device 26 that sets a complex coefficient for the complex multiplier 24 to effect baseband steering of the primary transmit beam. Baseband steering of the primary transmit beam by setting a complex coefficient for each complex multiplier 24 is known in the art, and details thereof can be obtained, for example, by reference to U.S. Pat. No. 8,587,495 and/or to "A Primer on Digital Beamforming", by Toby Haynes, in Spectrum Signal Processing, Mar. 26, 1998, the entire contents of said patent and said primer being incorporated herein by reference thereto.

Figure 4:
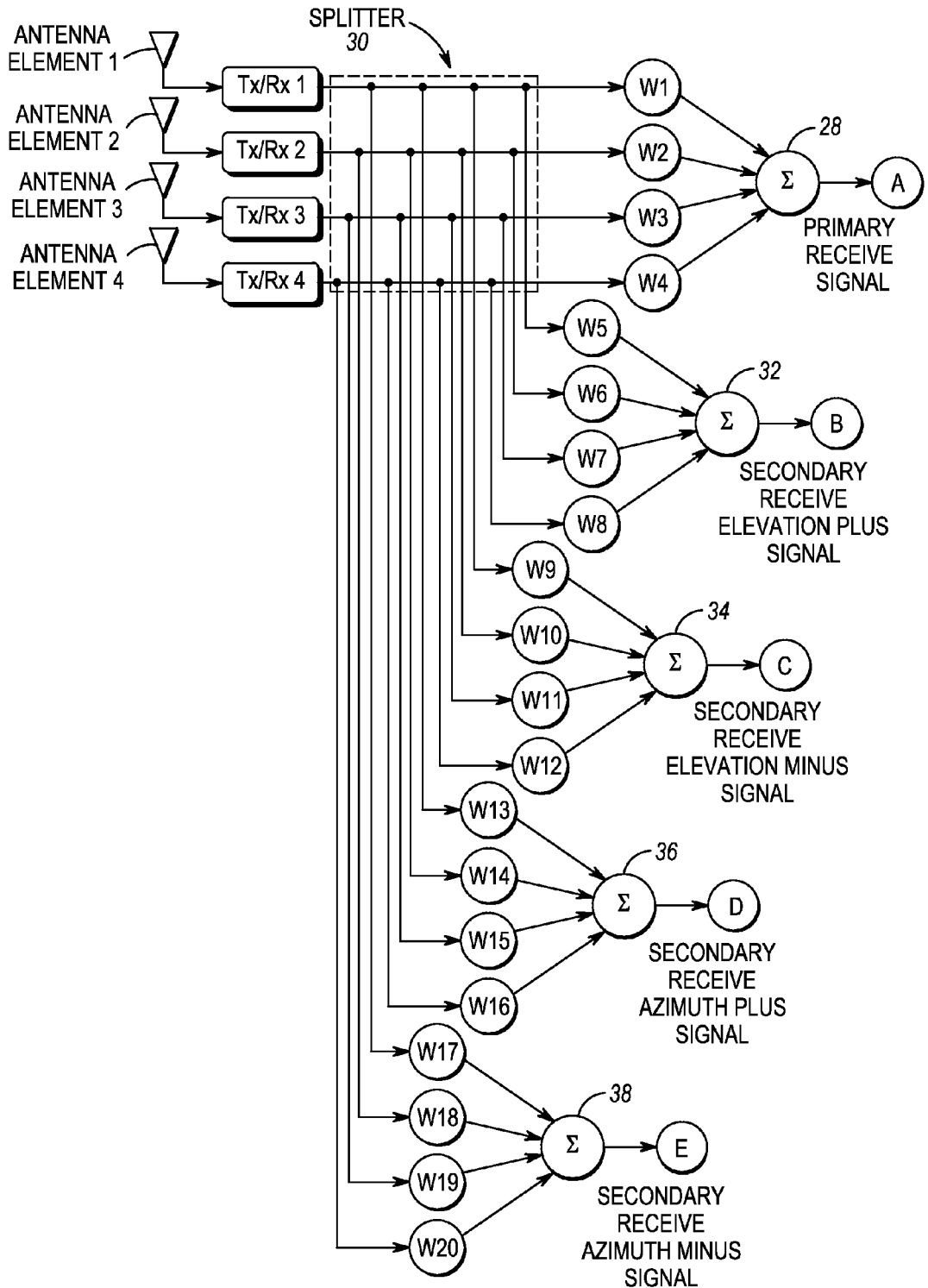
FIG. 4 is a schematic diagram depicting components of the overall system of FIG. 1 during reception of the primary receive signal, as well as of additional secondary receive signals.

The controller 16 also executes the tag processing module 18 by which the transceivers are commanded to act as a primary receive beam steering unit operative for steering a primary receive beam 120 (FIG. 8) along a boresight axis 130 (FIG. 8) at a primary steering angle by receiving a primary receive signal (A) via the antenna elements from each tag. As shown in FIG. 4, the antenna elements 1, 2, 3 and 4 receive return signals from each interrogated tag along different channels (in this example, four), and then a complex weighting factor W1, W2, W3 and W4 is introduced on each channel before all the weighted return signals are summed in an adder 28 in order to generate the primary receive signal (A). Each weighting factor is generated by the circuit of FIG. 3B. Steering of the primary receive beam 120 is effected by the weighting factors W1, W2, W3 and W4. As illustrated, the weighting factors (FIG. 4) used in steering the primary receive beam 120 is, in a preferred embodiment, the same as the weighting factors (FIG. 3A) used in steering the primary transmit beam. As a result, the steering angle for both the primary transmit beam and the primary receive beam 120 is the same, or nearly so, i.e., they have a common boresight axis 130 or general bearing, in which event, both the primary transmit beam and the primary receive beam 120 can each be individually referred to as a reference beam. However, it will be understood that the weighting factors used in steering the primary receive beam 120 may be different from the weighting factors used in steering the primary transmit beam, in which case, the steering angle for the primary transmit beam is different from the steering angle for the primary receive beam 120.

As described above, the practical limit on the number N of antenna elements that can be used in the array causes the primary transmit beam and the corresponding primary receive beam 120 to each have a relatively broad beam width, thereby rendering it difficult in practice to very accurately determine or estimate the true bearing, i.e., the angular direction both in azimuth and elevation, of a particular tag, relative to the reader. Bearing errors on the order of 5 to 10 degrees have been reported and are not tolerable in many applications.

As further shown in FIG. 4, the return signals from each interrogated tag from the antenna elements 1, 2, 3 and 4 are conducted through respective RF transceivers Tx/Rx 1, Tx/Rx 2, Tx/Rx 3 and Tx/Rx 4, to a splitter 30, and then routed to four sub-circuits to simultaneously generate four different secondary receive signals corresponding to four different secondary receive beams 122, 124, 126, and 128 (FIG. 8) that are offset from the primary beam 120, as described below. Thus, the return signals are conducted from the splitter 30 to weighting factors W5, W6, W7 and W8 before being summed in an adder 32 to generate a secondary receive plus elevation signal (B), corresponding to a synthesized receive beam 122 featuring a larger peak elevation angle than the primary beam 120; to weighting factors W9, W10, W11 and W12 before being summed in an adder 34 to generate a secondary receive minus elevation signal (C), corresponding to a synthesized receive beam 124 featuring a smaller peak elevation angle than the primary beam 120; to weighting factors W13, W14, W15 and W16 before being summed in an adder 36 to generate a secondary receive plus azimuth signal (D), corresponding to a synthesized receive beam 126 featuring a larger peak azimuth angle than the primary beam 120; and to weighting factors W17, W18, W19 and W20 before being summed in an adder 38 to generate a secondary receive minus azimuth signal (E), corresponding to a synthesized receive beam 128 featuring a smaller peak azimuth angle than the primary beam 120. Put another way, the return signal from antenna element 1 is conducted through transceiver Tx/Rx 1 to weighting factors W1, W5, W9, W13 and W17; the return signal from antenna element 2 is conducted through transceiver Tx/Rx 2 to weighting factors W2, W6, W10, W14 and W18; the return signal from antenna element 3 is conducted through transceiver Tx/Rx 3 to weighting factors W3, W7, W11, W15 and W19; and the return signal from antenna element 4 is conducted through transceiver Tx/Rx 4 to weighting factors W4, W8, W12, W16 and W20.

Each weighting factor W5 through W20 is generated by a circuit identical to that depicted in FIG. 3B. The weighting factors W5, W6, W7 and W8 are selected such that the secondary receive beam 122 formed by the plus elevation signal (B) has a steering angle that is located a few degrees, e.g., ten degrees, in one direction away from the elevation of the primary steering angle of the primary beam 120, and the weighting factors W9, W10, W11 and W12 are selected such that the secondary receive beam 124 formed by the minus elevation signal (C) has a steering angle that is located a few degrees, e.g., ten degrees, in an opposite direction away from the elevation of the primary steering angle of the primary beam 120. The weighting factors W13, W14, W15 and W16 are selected such that the secondary receive beam 126 formed by the plus azimuth signal (D) has a steering angle that is located a few degrees, e.g., ten degrees, in one direction away from the azimuth of the primary steering angle of the primary beam 120. The weighting factors W17, W18, W19 and W20 are selected such that the secondary receive beam 128 formed by the minus azimuth signal (E) has a steering angle that is located a few degrees, e.g., ten degrees, in an opposite direction away from the azimuth of the primary steering angle of the primary beam 120.

Thus, four secondary receive beams 122, 124, 126, and 128 (FIG. 8) have been formed. The secondary receive beams may be formed simultaneously, or sequentially, provided that they are all formed within a time frame during which the RFID tag being located is not expected to be moved to any appreciable extent. The secondary receive beams 122, 124 formed by the plus and minus elevation signals (B) and (C) bracket the elevation of the primary beam 120. The secondary receive beams 126, 128 formed by the plus and minus azimuth signals (D) and (E) bracket the azimuth of the primary beam 120. The terms "plus" and "minus", as used herein to describe the signals (B), (C), (D), and (E), are intended to describe the opposite directions in which the secondary receive beams are steered.

Figure 5:
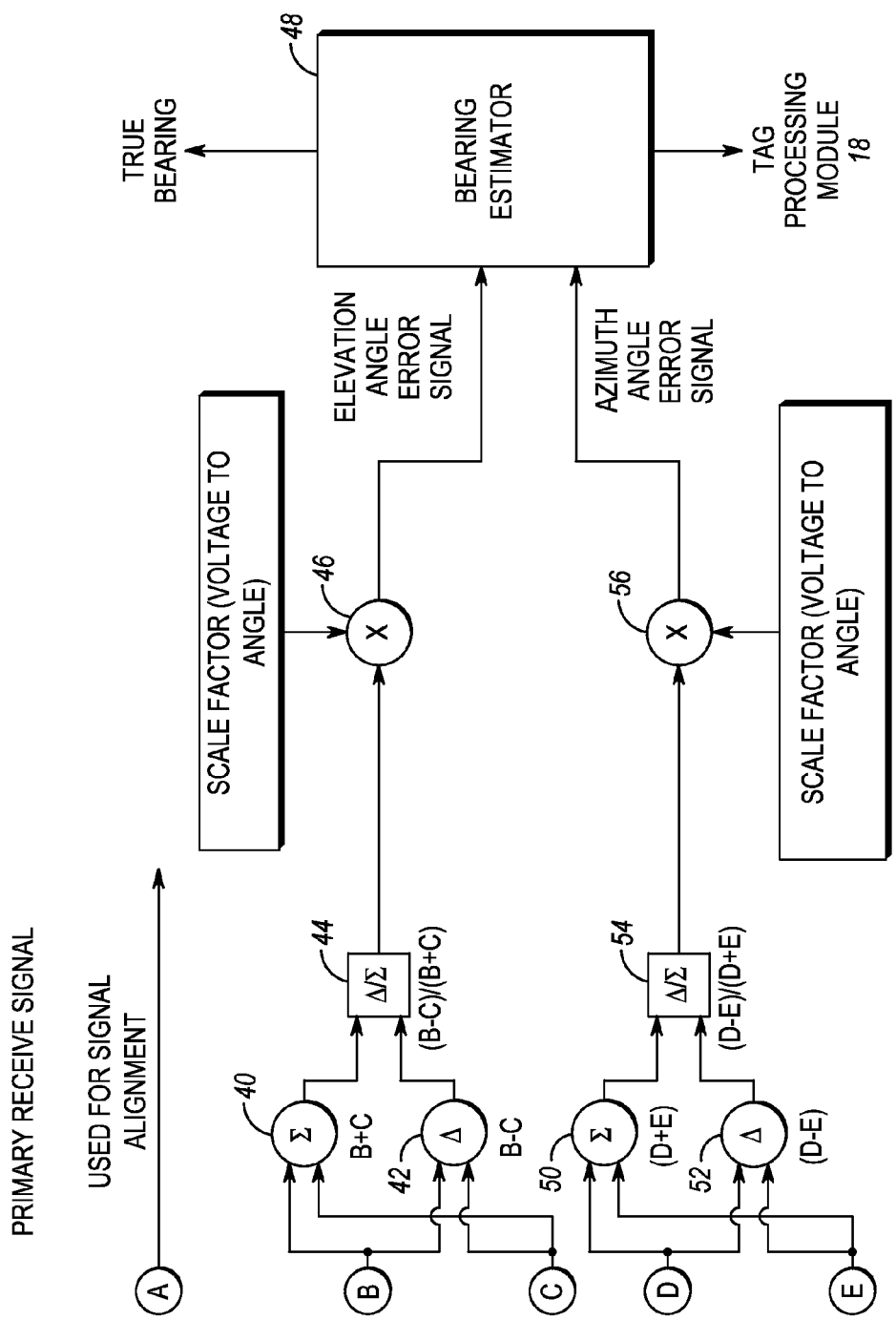
FIG. 5 is a block diagram depicting signal processing of the primary and the secondary receive signals depicted in FIG. 4 to obtain a bearing for each RFID-tagged item.

Turning now to FIG. 5, the elevation signals (B) and (C) and the azimuth signals (D) and (E) are separately processed to obtain elevation and azimuth bearing correction factors used to determine the true bearing of each interrogated tag. Thus, the elevation signals (B) and (C) are summed in an adder 40, and are differenced from each other in a subtractor 42. A divider 44 divides the difference (B−C) from the subtractor 42 by the sum (B+C) from the adder 40, and the output of the divider 44, which is a voltage, is converted to an angle by a converter 46, thereby yielding an elevation angle error signal that is input to a bearing estimator 48. Also, the azimuth signals (D) and (E) are summed in an adder 50, and are differenced from each other in a subtractor 52. A divider 54 divides the difference (D−E) from the subtractor 52 by the sum (D+E) from the adder 50, and the output of the divider 54, which is a voltage, is converted to an angle by a converter 56, thereby yielding an azimuth angle error signal that is input to the bearing estimator 48. The bearing estimator 48 compares the two elevation and azimuth angle error signals against the elevation and azimuth of the primary receive signal (A), and outputs a true bearing for each interrogated tag. This output can be stored, or sent to the server 12, or it can be sent to the tag processing module 18 for beam steering.

As described above, four of the antenna elements are employed to steer the four secondary receive beams 122, 124, 126, and 128 at opposite sides of the primary beam 120. In another embodiment, sixteen RF transceivers may be used to connect to sixteen antenna elements, and the beams corresponding to secondary receive signals (A), (B), (C), (D), and (E) may be formed using a circuit that employs sixteen complex multipliers. In yet another embodiment, sixteen antenna elements are employed in the array, and a switch is used to switch the same four RF transceivers to four of the sixteen antenna elements. At any given time, four out of the sixteen antenna elements are active, while the remaining twelve antenna elements are inactive. These four antenna elements are effectively working in one volume or sector of space in the controlled area 102. The remaining antenna elements in the array are preferably working successively or sequentially in the same or in different volumes or sectors of space in the controlled area. The antenna elements work in groups, typically four at a time, and advantageously, there may be overlap in volume or sector coverage between antenna elements in the different groups. It will be understood that this disclosure is not intended to be limited to a group of four antenna elements, because a different number or group of antenna elements, and a different number or group of secondary receive beams, could be employed.

As described above, four separate subcircuits are employed, as shown in FIG. 4, to simultaneously generate the two elevation signals (B) and (C) and the two azimuth signals (D) and (E), and to simultaneously steer their secondary receive beams. In a time-multiplexed variation, one or more such subcircuits can be shared. For example, only one such subcircuit could be employed, and different sets of weighting factors could be sequentially applied at the one such subcircuit to sequentially generate the signals (B), (C), (D) and (E), and to sequentially steer their secondary receive beams.

Figure 6:
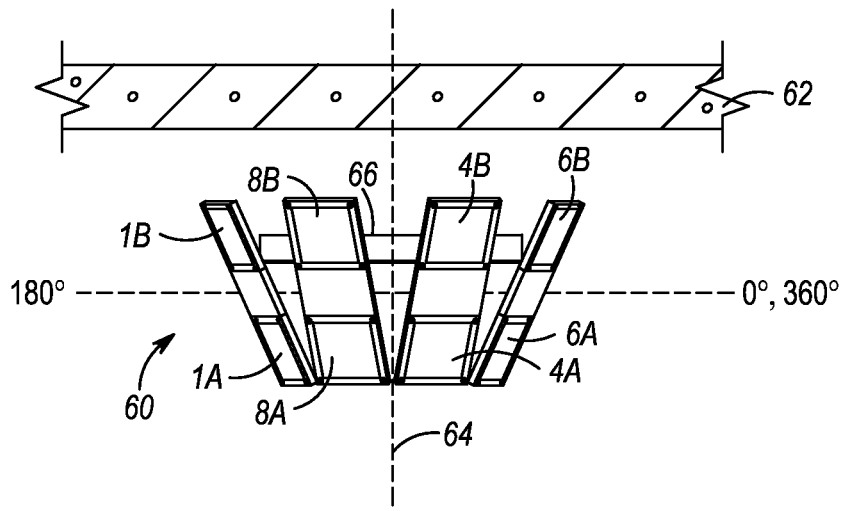
FIG. 6 is a side view of an antenna array of the overhead RFID reader of FIG. 2.
Figure 7:
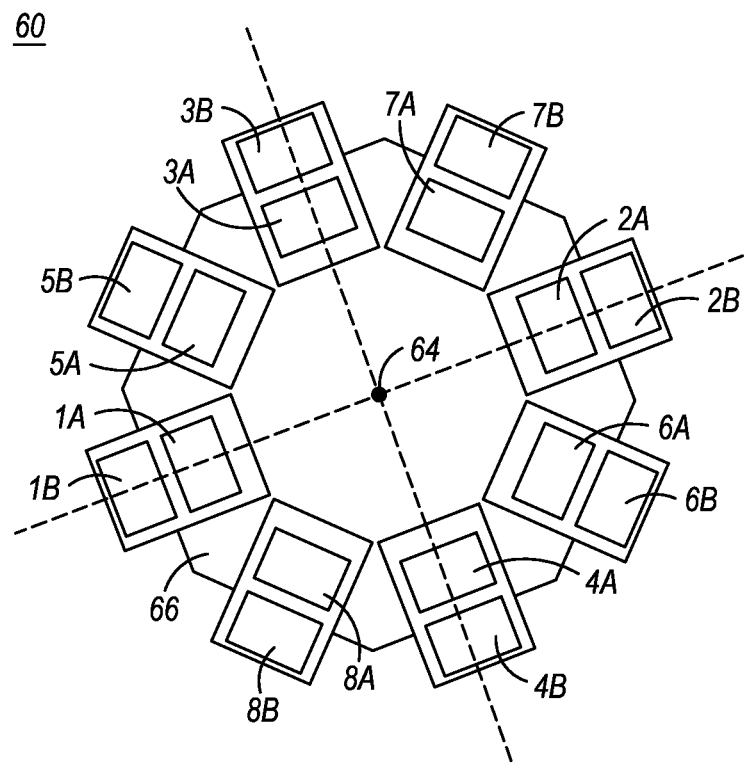
FIG. 7 is a top plan view looking down on the antenna array of FIG. 6.

FIGS. 6-7 depict an exemplary embodiment of an overhead antenna array 60 for the reader 20. The system or the reader 20 may have a plurality of such arrays 60. The overhead array 60 is mounted on a planar ceiling 62 and is advantageously comprised of sixteen antenna elements arranged, preferably equiangularly, circumferentially around and about a central vertical axis 64, or plumb line, which is generally perpendicular to the plane of the ceiling 62. The antenna elements are mounted in pairs on generally planar supports or antenna planes that are tilted relative to the vertical axis 64 and assume a generally frustoconical shape. Antenna elements 1A, 2A, 3A, 4A, 5A, 6A, 7A and 8A are arranged in a lower annulus at a lower elevation as compared to an upper annulus in which the antenna elements 1B, 2B, 3B, 4B, 5B, 6B, 7B and 8B are arranged at a higher elevation. As previously noted, the antenna elements work in groups, typically four at a time. Each antenna element is advantageously configured as a patch antenna and can be energized with a horizontal or a vertical polarization. The antenna elements are supported by an octagonal main support 66, which also advantageously supports other components of the reader 20.

Figure 8:
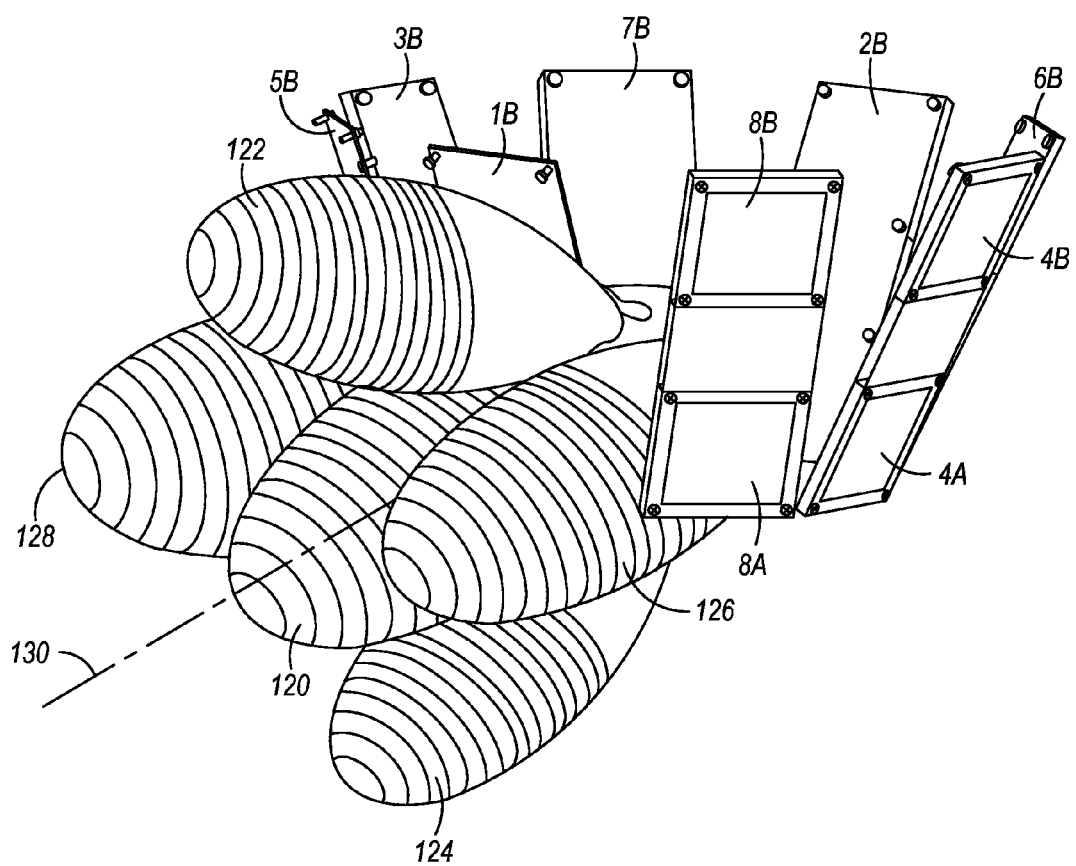
FIG. 8 is an enlarged, perspective view of the primary and secondary receive beams radiated by the antenna array of FIG. 6 in accordance with the present disclosure.

As shown in FIG. 8, the overhead array 60 receives the primary receive beam 120 that extends along the boresight axis 130, as well as the four secondary receive beams 122, 124, 126, and 128 at opposite sides of, and bracketing, the boresight axis 130. The controller 16 steers the primary receive beam 120 to a plurality of locations of the controlled area in a coarse scan, also known as a star scan. As depicted in FIG. 9, these locations are marked with an "X" and are spaced apart in a mutually orthogonal array of an odd number or index of rows and an odd number or index of columns. Although fifteen such rows and columns are shown, a different number could have been selected, and the number of rows need not necessarily equal the number of columns. The star scan is described as being coarse, because the primary beam 120 is not steered to each and every location in the array. Thus, the number of rows and columns is less than the number of all the rows and columns in the controlled area. In a preferred embodiment, the controlled area 102 is subdivided into eight sectors, and each sector is further subdivided into the 15×15=225 locations depicted in FIG. 9, and each row or column measures about 5 degrees in azimuth, or in elevation. FIG. 9 depicts the 225 locations in a plane generally perpendicular to the boresight axis 130.

If a tag is found at one of the marked locations in the sector of FIG. 9, then the controller 16 steers the four secondary receive beams 122, 124, 126, and 128 at that one marked location, and the above-described elevation and azimuth angle error signals are generated and processed to output a true bearing for each interrogated tag. There are conditions, however, when the RSSI of one or more of the secondary receive signals (B), (C), (D) and (E) is too low to generate the above-described elevation and azimuth angle error signals. As explained above, real-world conditions may sometimes interfere with the generation and processing of the secondary receive signals (B), (C), (D) and (E). For example, the controlled area 102 may contain shelving, fixtures, equipment, vehicles, and the like, not to mention the floor, the ceiling and the room walls, each or all of which can reflect and scatter one or more of the secondary receive beams 122, 124, 126, and 128 incident thereon, thereby compromising the generation and processing of their corresponding secondary receive signals such that one or more of such receive signals have no or low power, i.e., their RSSI is below a minimum acceptable threshold, due to multi-path reflections, destructive interference among signals, ambient temperature variations, etc.

In addition, a tag may not be found at one of the marked locations in the sector of FIG. 9, because its primary receive signal has an RSSI below a minimum acceptable threshold. Hence, when the power of any of the primary and secondary receive signals is too low, then the RFID system described so far cannot always accurately estimate the true bearing of a tag with a high degree of resolution in such a real-world, multi-path reflection environment. One aspect of the present disclosure is to estimate the bearing of a tag despite such low power receive signals.

Figure 11:
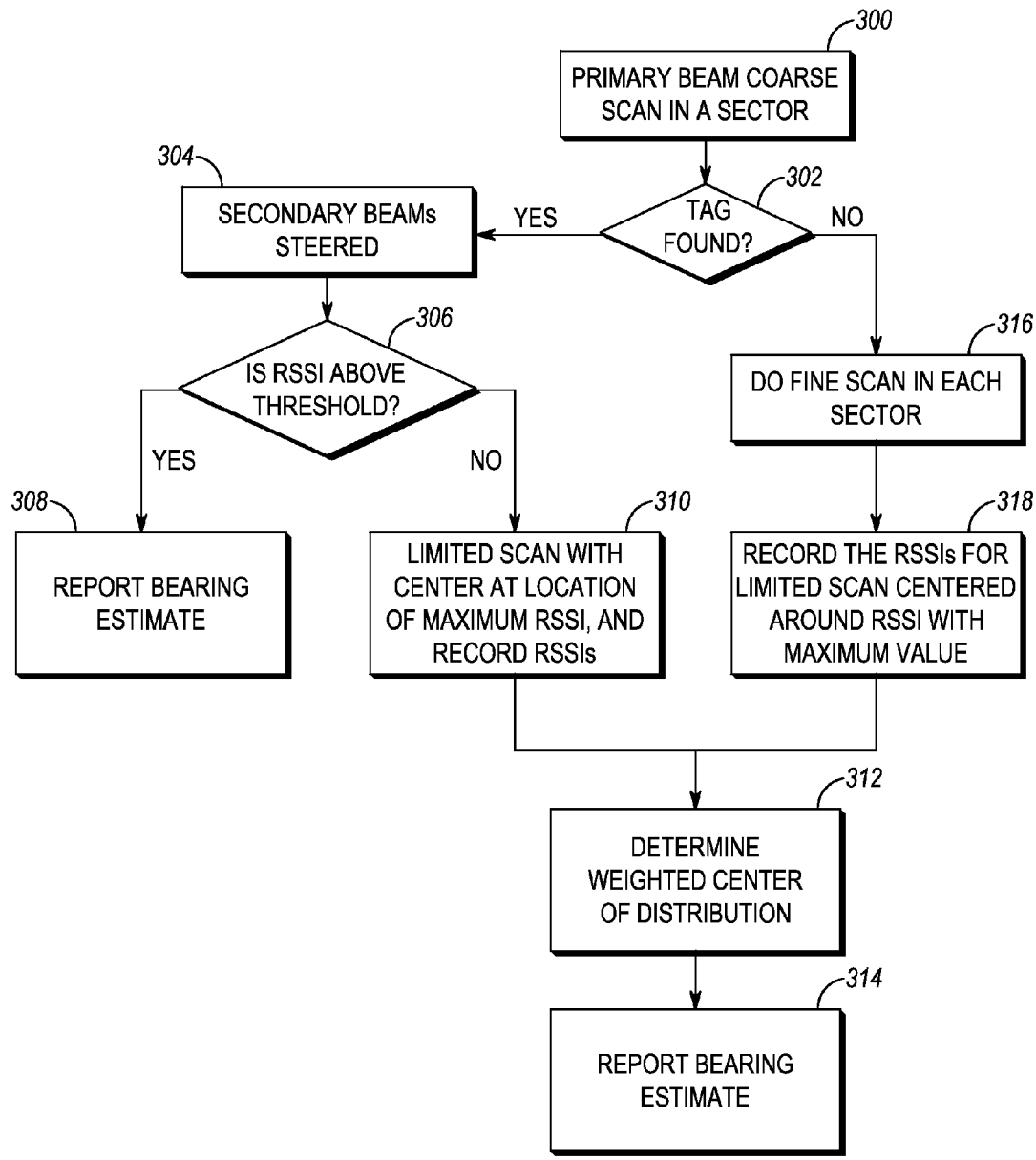
FIG. 11 is a flow chart depicting steps performed in accordance with a method of estimating bearings of RFID tags associated with items in the controlled area in accordance with the present disclosure.

As best shown in the flow chart of FIG. 11, the controller 16, in step 300, steers the primary receive beam to the plurality of marked locations of the sector in the controlled area in a coarse scan (FIG. 9). At each marked location, the primary receive beam may be horizontally or vertically polarized. If a tag is found in step 302, then the controller 16 steers the secondary receive beams to the found tag in step 304. In step 306, the controller 16 compares a receive signal strength indicator (RSSI) of at least one of the secondary receive signals against a threshold. When the RSSI is above the threshold, then a bearing estimate is reported by the bearing estimator 48, as described above, in step 308.

However, in accordance with the present disclosure, when the RSSI is below the threshold, then the controller 16, in step 310, determines the location at which the RSSI of the primary receive signal is a maximum in the sector, steers the primary receive beam in a limited scan to an array of locations distributed around the location at which the RSSI is a maximum. One embodiment of the limited scan is depicted in FIG. 10 as a mutually orthogonal arrangement of an odd number or index of rows and an odd number or index of columns. Although three such rows and columns are shown, a different number, and also an even number, could have been selected, and the number of rows need not necessarily equal the number of columns. Thus, the number of rows and columns in the limited scan is less than the number of the rows and columns in the coarse scan. The location at which the RSSI is a maximum is positioned at a center of the array, e.g., row 2, column 2.

The controller 16, in step 310, also records the RSSI of the primary receive signal at each location of the limited scan. As used herein, the term "records" is intended to cover both permanent and transient storage of the RSSI in a memory accessible to the controller. The negative numerals in FIG. 10 are merely exemplary and constitute the RSSIs recorded at the intersection of each row and column, and are expressed in dBm. The controller 16, in step 312, processes the recorded RSSIs at each location of the limited scan to determine an effective weighted center of distribution of the recorded RSSIs, and estimates the bearing for the tag based on the weighted center of distribution in step 314.

If all the recorded RSSIs were the same, then the center of distribution would be in the center of the array, e.g., row 2, column 2, of the limited scan. In practice, the recorded RSSIs are different and, in the example shown in FIG. 10, the RSSIs decrease towards the right and downwardly. The weighted center of distribution in the limited scan is determined by calculating a row or elevation coordinate, and by calculating a column or azimuth coordinate. The azimuth coordinate is obtained by multiplying the difference between the column index and a reference index (e.g., column 1) by the RSSI for that beam, then summing the result for all the columns, and then dividing the result by the sum of all the RSSIs, as set forth in the equation below. The elevation coordinate is obtained by multiplying the difference between the row index and a reference index (e.g., row 1) by the RSSI for that beam, then summing the result for all the rows, and then dividing the result by the sum of all the RSSIs, as set forth in the equation below.

$$W = \frac{\sum_{m}^{M} RSSI_m * (Index_m - Index_1)}{\sum_{m}^{M} RSSI_m}$$

where $Index_m$ is the index of an individual row or column in the limited scan,
where $Index_1$ is the index of the first or reference row or column in the limited scan,
where $RSSI_m$ is the value of the RSSI of an individual row or column in the limited scan,
where m is the individual row or column in the limited scan,
where M is the total number of rows or columns in the limited scan, and
where W is the azimuth or elevation coordinate of the weighted center of distribution in the limited scan.

The weighted center of distribution in the limited scan is shown in FIG. 10 as decreasing towards the right and downwardly from the reference row 1, reference column 1. Once the azimuth and elevation coordinates are known, they can be converted to azimuth and elevation correction bearing angles by multiplying the coordinates by 5 degrees in the illustrated example, since, as mentioned above, each row or column represents an angle of 5 degrees.

Returning to FIG. 11, if a tag was not found in step 302, then a fine scan is performed in each sector in step 316 in which the primary beam 120 is steered to each and every one of the 225 locations (FIG. 9) in each sector. At each location, the primary receive beam may be horizontally or vertically polarized. The controller 16 determines in which one of the sectors the RSSI of the primary receive signal is a maximum, and then the controller 16 steers the primary receive beam in that sector in a limited scan, as described above, to an array of locations distributed around the location at which the RSSI is a maximum. The controller 16 then performs steps 312 and 314 as described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A radio frequency (RF) identification (RFID) tag reading system for estimating a bearing of an RFID tag associated with an item in a controlled area having sectors, comprising:
   an RFID reader having a plurality of antenna elements, and a plurality of RF transceivers; and
   a controller operatively connected to the transceivers, and configured to control the transceivers by executing a tag processing module operative for steering a primary transmit beam in the controlled area by transmitting a primary transmit signal via the antenna elements to the tag, and by steering a primary receive beam in the controlled area at a primary steering angle by receiving a primary receive signal via the antenna elements from the tag,
   the controller being further configured to control the transceivers by executing a bearing processing module configured to steer a plurality of secondary receive beams in the controlled area at respective secondary steering angles that are offset from the primary steering angle by receiving a plurality of secondary receive signals via the antenna elements from the tag,
   the controller being further configured to steer the primary receive beam to a plurality of locations of a sector in the controlled area in a coarse scan to find the tag, steer the secondary receive beams to the found tag, compare a receive signal strength indicator (RSSI) of at least one of the secondary receive signals against a threshold, and, when the RSSI is below the threshold, determine the location at which the RSSI of the primary receive signal is a maximum, and steer the primary receive beam in a limited scan to an array of locations distributed around the location at which the RSSI is a maximum, and record the RSSI of the primary receive signal at each location of the limited scan, and
   the controller being further configured to process the recorded RSSIs at each location of the limited scan to determine an effective weighted center of distribution of the recorded RSSIs, and estimate the bearing for the tag based on the weighted center of distribution, wherein the number of locations in the limited scan is less than the number of locations in the coarse scan.

2. The system of claim 1, wherein the controller is configured to steer the primary receive beam to a subset of the locations that are spaced apart from one another in the sector in the coarse scan.

3. The system of claim 1, wherein the controller is configured to steer the primary receive beam to all of the locations in each sector in a fine scan when the tag was not found during the coarse scan, and determine in which one of the sectors the RSSI of the primary receive signal is a maximum, and wherein the controller performs the limited scan in said one sector.

4. The system of claim 1, wherein the array of locations in the limited scan is a mutually orthogonal arrangement of an odd number of rows and an odd number of columns, and wherein the location at which the RSSI is a maximum is at a center location of the array.

5. A radio frequency (RF) identification (RFID) tag reading system for estimating a bearing of an RFID tag associated with an item in a controlled area having sectors, comprising:
   an RFID reader mounted in the controlled area, and having a plurality of antenna elements, and a plurality of RF transceivers;
   a server operatively connected to the RFID reader; and
   a controller located in at least one of the RFID reader and the server and operatively connected to the transceivers, and configured to control the transceivers by executing a tag processing module configured to steer a primary transmit beam in the controlled area by transmitting a primary transmit signal via the antenna elements to the tag, and steer a primary receive beam in the controlled area at a primary steering angle by receiving a primary receive signal via the antenna elements from the tag,
   the controller being further configured to control the transceivers by executing a bearing processing module configured to steer a plurality of secondary receive beams in the controlled area at respective secondary steering angles that are offset from the primary steering angle by receiving a plurality of secondary receive signals via the antenna elements from the tag,
   the controller being further configured to steer the primary receive beam to a plurality of locations of a sector in the controlled area in a coarse scan to find the tag, steer the secondary receive beams to the found tag, compare a receive signal strength indicator (RSSI) of at least one of the secondary receive signals against a threshold, and, when the RSSI is below the threshold, determine the location at which the RSSI of the primary receive signal is a maximum, and steer the primary receive beam in a limited scan to an array of locations distributed around the location at which the RSSI is a maximum, and record the RSSI of the primary receive signal at each location of the limited scan, and
   the controller being further configured to process the recorded RSSIs at each location of the limited scan to determine an effective weighted center of distribution of the recorded RSSIs, and estimate the bearing for the tag based on the weighted center of distribution, wherein the number of locations in the limited scan is less than the number of locations in the coarse scan.

6. The system of claim 5, wherein the controller is configured to steer the primary receive beam to a subset of the locations that are spaced apart from one another in the sector in the coarse scan.

7. The system of claim 5, wherein the controller is configured to steer the primary receive beam to all of the locations in each sector in a fine scan when the tag was not found during the coarse scan, and determine in which one of the sectors the RSSI of the primary receive signal is a maximum, and wherein the controller performs the limited scan in said one sector.

8. The system of claim 5, wherein the array of locations in the limited scan is a mutually orthogonal arrangement of an odd number of rows and an odd number of columns, and wherein the location at which the RSSI is a maximum is at a center location of the array.

9. A radio frequency (RF) identification (RFID) tag reading method of estimating a bearing of an RFID tag associated with an item in a controlled area having sectors, comprising:
  operating an RFID reader having a plurality of antenna elements, and a plurality of RF transceivers, in the controlled area;
  controlling the transceivers by executing a tag processing module operative for steering a primary transmit beam in the controlled area by transmitting a primary transmit signal via the antenna elements to the tag, and for steering a primary receive beam in the controlled area at a primary steering angle by receiving a primary receive signal via the antenna elements from the tag;
  controlling the transceivers by executing a bearing processing module operative for steering a plurality of secondary receive beams in the controlled area at respective secondary steering angles that are offset from the primary steering angle by receiving a plurality of secondary receive signals via the antenna elements from the tag;
  steering the primary receive beam to a plurality of locations of a sector in the controlled area in a coarse scan to find the tag;
  steering the secondary receive beams to the found tag;
  comparing a receive signal strength indicator (RSSI) of at least one of the secondary receive signals against a threshold, and, when the RSSI is below the threshold, determining the location at which the RSSI of the primary receive signal is a maximum;
  steering the primary receive beam in a limited scan to an array of locations distributed around the location at which the RSSI is a maximum, wherein the number of locations in the limited scan is less than the number of locations in the coarse scan;
  recording the RSSI of the primary receive signal at each location of the limited scan;
  processing the recorded RSSIs at each location of the limited scan to determine an effective weighted center of distribution of the recorded RSSIs; and
  estimating the bearing for the tag based on the weighted center of distribution.

10. The method of claim 9, and steering the primary receive beam to a subset of the locations that are spaced apart from one another in the sector in the coarse scan.

11. The method of claim 9, and steering the primary receive beam to all of the locations in each sector in a fine scan when the tag was not found during the coarse scan, and determining in which one of the sectors the RSSI of the primary receive signal is a maximum, and performing the limited scan in said one sector.

12. The method of claim 9, and configuring the array of locations in the limited scan as a mutually orthogonal arrangement of an odd number of rows and an odd number of columns, and positioning the location at which the RSSI is a maximum at a center location of the array.

* * * * *